United States Patent [19] [11] Patent Number: 4,540,544
Jakobsen et al. [45] Date of Patent: Sep. 10, 1985

[54] METHOD OF PRODUCING A BIAXIALLY ORIENTED CONTAINER OF POLYETHYLENE TEREPHTHALATE OR SIMILAR MATERIAL

[75] Inventors: Kjell M. Jakobsen, Skanor; Claes T. Nilsson, Loddeköpinge, both of Sweden

[73] Assignee: PLM AB, Malmo, Sweden

[21] Appl. No.: 489,733

[22] Filed: Apr. 29, 1983

Related U.S. Application Data

[62] Division of Ser. No. 264,829, May 18, 1981, Pat. No. 4,467,929.

[30] Foreign Application Priority Data

May 29, 1980 [SE] Sweden .............................. 8004003
Dec. 10, 1980 [SE] Sweden .............................. 8008650

[51] Int. Cl.³ ............................................ B29C 17/07
[52] U.S. Cl. .................................... 264/532; 264/531; 264/534; 264/535; 425/526; 425/529
[58] Field of Search ............... 264/520, 521, 523, 531, 264/532, 534, 535, 537, 538, 540; 425/522, 525, 526, 528, 529, 533

[56] References Cited

U.S. PATENT DOCUMENTS 3,651,186  3/1968  Hall ......................... 264/94
3,949,034  4/1976  Uhlig ....................... 264/534 X
4,177,239 12/1979  Gittner et al. ............. 264/532 X
4,409,176 10/1983  Jakobsen et al. ........... 264/534 X Primary Examiner—Jan Silbaugh
Attorney, Agent, or Firm—Roberts, Spiecens & Cohen

[57] ABSTRACT

A method for producing a container from a tubular blank of polyethylene terephthalate or similar material, according to which a polyethylene terephthalate blank is stretched at least approximately 3-fold to produce a preform (20). In an axial section through the preform, the contour length substantially corresponds to the contour length in an axial section through the final container. The preform (20) is heated to a temperature above the glass transition temperature (TG) and is converted to the container (21) in a blow mold (12). In doing so, the contour length of the material is maintained through successive reduction of the axial length of the body (23) which the preform constitutes during the conversion to the container. In order to achieve this, the base portion of the blow mold (11) is moved towards the orifice (22) of the final container. The container acquires a neck portion (23) and a container body (26) which are axially oriented, in the case of polyethylene terephthalate to an extent corresponding to about a 3-fold monoaxial stretching, while the container body (26) is also transversely oriented, in the case of polyethylene terephthalate to an extent corresponding to about a 3-fold stretching as a maximum. The wall thickness of the container is inversely proportional to the radius of the container. The container is dimensionally very stable and has excellent strength characteristics.

23 Claims, 4 Drawing Figures

METHOD OF PRODUCING A BIAXIALLY ORIENTED CONTAINER OF POLYETHYLENE TEREPHTHALATE OR SIMILAR MATERIAL

This application is a division of application Ser. No. 264,829, filed May 18, 1981, now U.S. Pat. No. 4,467,929.

FIELD OF THE INVENTION

The present invention relates to a method for moulding a container, starting from a tubular blank of polyethylene terephthalate or similar material, wherein, according to the invention, the blank is stretched axially, in the case of polyethylene terephthalate at least 3-fold, in order to produce a preform, in which the material has a profile length which substantially corresponds to or exceeds the profile length of those parts of the container which correspond to the stretched part of the preform, after which the preform is heated to the moulding temperature and converted to the container.

PRIOR ART

In the production of containers made of a thermoplastic, where the material has a property that its strength and stability increase with orientation of the material, it is desirable that as large a proportion of the container as possible should consist of oriented material. The material is oriented by a stretching procedure, with biaxially stretched material giving the best utilization of the available amount of material. Especially in the case of bottle-type containers it is, however, difficult to achieve stretching, and thereby create orientation, of, for example, the neck and orifice parts, and in certain cases even of the centrally located base parts.

Swedish Patent Application No. SE 8004003-3 and corresponding U.S. Pat. No. 4,405,546 disclose how axial orientation of the material in the preform can be achieved by a mechanical procedure wherein a preform passes through one or more draw rings which reduce the wall thickness in the preform and thereby also the outer diameter of the preform. It has been shown that the best effect is achieved when the material in the preform, immediately prior to stretching, has a temperature within or below but near the region of the glass transition temperature (TG) of the material. The axially oriented preform obtained by the process described is mechanically stable and the subsequent treatments for converting the stretched preform to a container must therefore be appropriate to this fact.

Exceptionally good mechanical properties are achieved with polyethylene terephthalate if the material, during stretching of the preform, is stretched at least about 3-fold. In this connection, an "over-stretching" of the material is easily achieved, resulting in the material in the preform shrinking during the heating of the preform to the moulding temperature, so that the preform reaches a length corresponding to that it would have reached on stretching about 3-fold.

On conversion of a preform, axially stretched as above, to a container, a problem arises in the form of fracture in the material if attempts are made to stretch the preform additionally to the stretching which the material has acquired through the axial orientation of the preform described above. During conversion of the preform to the container, one therefore seeks to limit the axial stretching of the preform and essentially let the conversion result in a stretching of the material only in the circumferential direction of the preform.

In certain applications, a particular combination of container length and container diameter is sought but it is not possible to produce such a container by known techniques because, during the conversion to a container, the material of the preform is stretched far too much in the axial direction of the preform. This problem arises with a container having a relatively large diameter in relation to the container length. Containers with such dimensional characteristics are normally involved with bottles having a volume of less than 0.5 liters.

SUMMARY OF THE INVENTION

The present invention contemplates, and a method for moulding a container, where the problems mentioned have been eliminated. The invention will be described especially in relation to polyethylene terephthalate, hereafter referred to as PET, but is, in principle, applicable to many other thermoplastics of the polyester or polyamide type.

Examples of such other materials are polyhexamethylene adipamide, polycaprolactam, polyhexamethylene sebacamide, polyethylene 2,6- and 1.5-naphthalate, polytetramethylene 1,2-dioxybenzoate and copolymers of ethylene terephthalate, ethylene isophthalate and other similar plastics polymers.

According to the invention, the material, in the form of a tubular blank of PET, is stretched at about least 3-fold to produce a preform having a length appropriate to the dimensions of the final container. The length, in the axial direction, of the stretched material of the preform is equal to or greater than the profile length of the parts which the stretched material constitutes in the container after conversion of the preform to a container. The preform is then heated to the moulding temperature and is converted to a container, for example in a blow mold. As the preform has a length greater than that of the final container, hence greater than that of the internal height of the blow mold, it is not possible, without special measures, to introduce the heated preform into the blow mold. According to the invention, the conversion of the preform to a container takes place so as to maintain the contour length of the material in an axial section through the body which is formed during the progressive conversion of the preform to a container, this being achieved through a successive reduction in the axial length of the body in question.

In a preferred embodiment of the invention, the material, immediately prior to the stretching in the axial direction of the blank, is at a temperature in the range of or preferably below the glass transition temperature (TG) of the material.

The tubular blank is preferably stretched by passing it through one or more draw rings so as to reduce the wall thickness of the material and at the same time diminish the outer circumference of the blank.

In an embodiment where the container has exceptionally high dimensional stability at elevated temperature, the blank is so chosen that the preform, on heating to the conversion temperature, suffers a reduction in contour length, in a section in the axial direction of the preform, to a value which is not below that of the contour length in an axial section of the final container.

In one embodiment of the invention, the base of the blow mold is moved, during the conversion of the preform to a container, in the axial direction of the preform and towards the orifice of the preform, in order to assume a position in which the final inner shape of the blow mold is fixed.

In another embodiment of the invention, a central portion of material at the base of the preform is reshaped and/or reduced in thickness through the portion of material being pressed between the base of the blow mold and a mandrel located inside the preform.

In a preferred device according to the invention, at least two and preferably three parts of the mould can be moved to and fro from a position where they cooperatively provide an inner shaping surface in the blow mould. Two of the mould parts are mould halves, which can be opened and shut in the normal manner, to form the blow mold. The third mould part is the base part of the blow mold and can be moved in the axial direction of the blow mold, so that the inner height of the blow mold can be varied.

Furthermore, a mandrel is used for fixing the preform, at its orifice, against two gripping halves, and for introducing excess pressure into the interior of the preform.

In particular embodiment of the invention, the inner mandrel ends in a shaping surface which fits the shape of the base portion of the blowmould. When the base portion is in its upper position, the mandrel accordingly cooperates with the base portion so as to reshape a central portion of the base of the preform and/or reduce the thickness of the central portion of the base.

In yet another embodiment of the invention, the base portion of the blow mold is provided with a central mould portion which is thermally insulated from the rest of the base portion. The central mould portion possesses channels for the transportation of liquid in order to control the temperature of the shaping surfaces of the central mould portion. The rest of the base portion is also provided with channels for the transportation of liquid and control of the temperature of the other shaping surfaces of the base portion. Furthermore, all the other mould portions, as well as the mandrel and the gripping halves, have channels which serve a corresponding purpose.

According to the invention, a container is formed which has a neck portion with axially oriented material and a container body which is biaxially oriented, preferably with the exception of a central base portion of the container body. The ratio of the material thickness in the container body and the material thickness in the neck portion is approximately equal to the ratio of the radius of the neck portion to the radius of the container body in any plane at right angles to the axis of the container.

In a preferred embodiment of the invention, the central portion of material at the base of the container and/or the orifice edge of the container consist of thermo-crystallized, opaque and dimensionally stable material.

BRIEF DESCRIPTION OF THE DRAWING

The invention is described in greater detail in relation to four figures of the drawing, in which.

DETAILED DESCRIPTION

Figure 1:
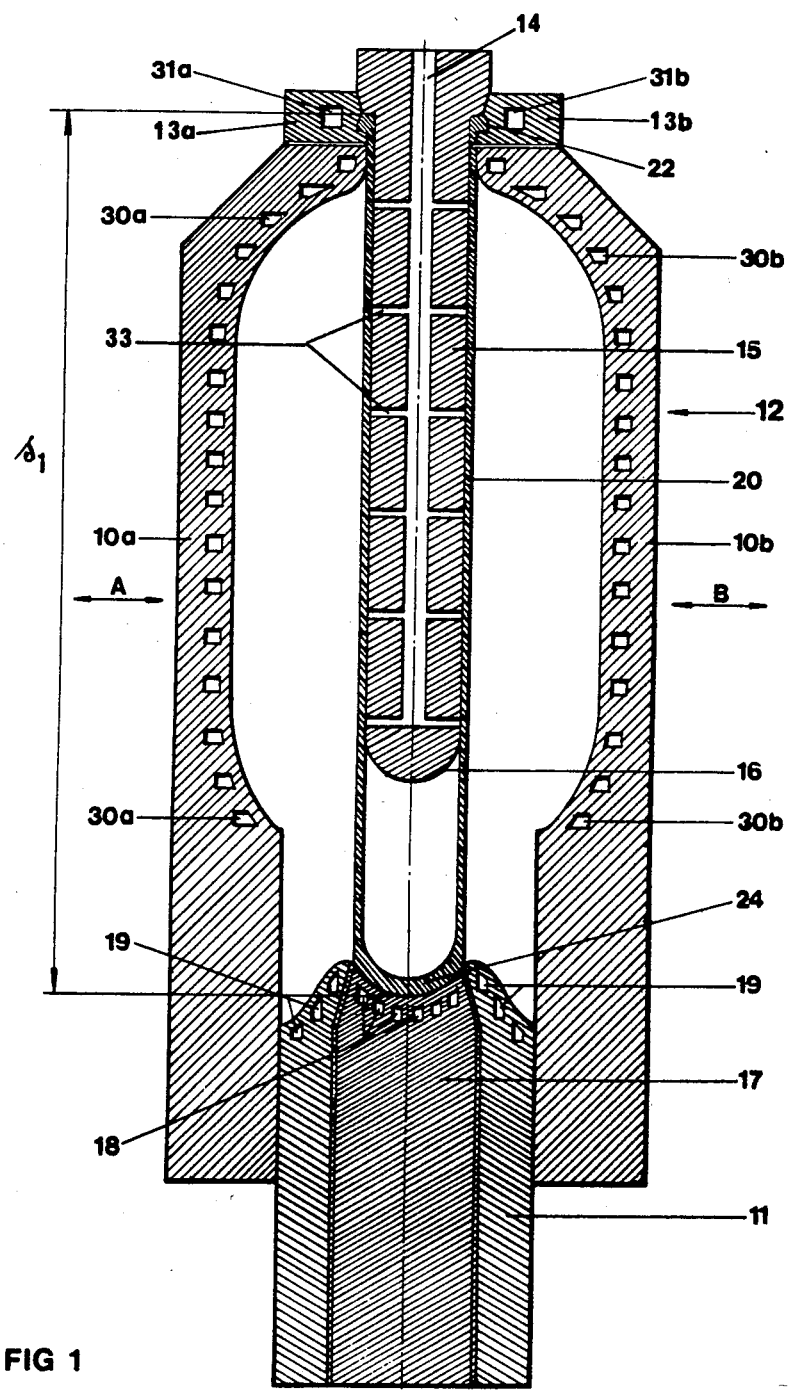
FIG. 1 shows a longitudinal section through a blow mold, with an axially stretched preform placed in the blow mold, and with the base portion of the blow mould in the lower position.
Figure 2:
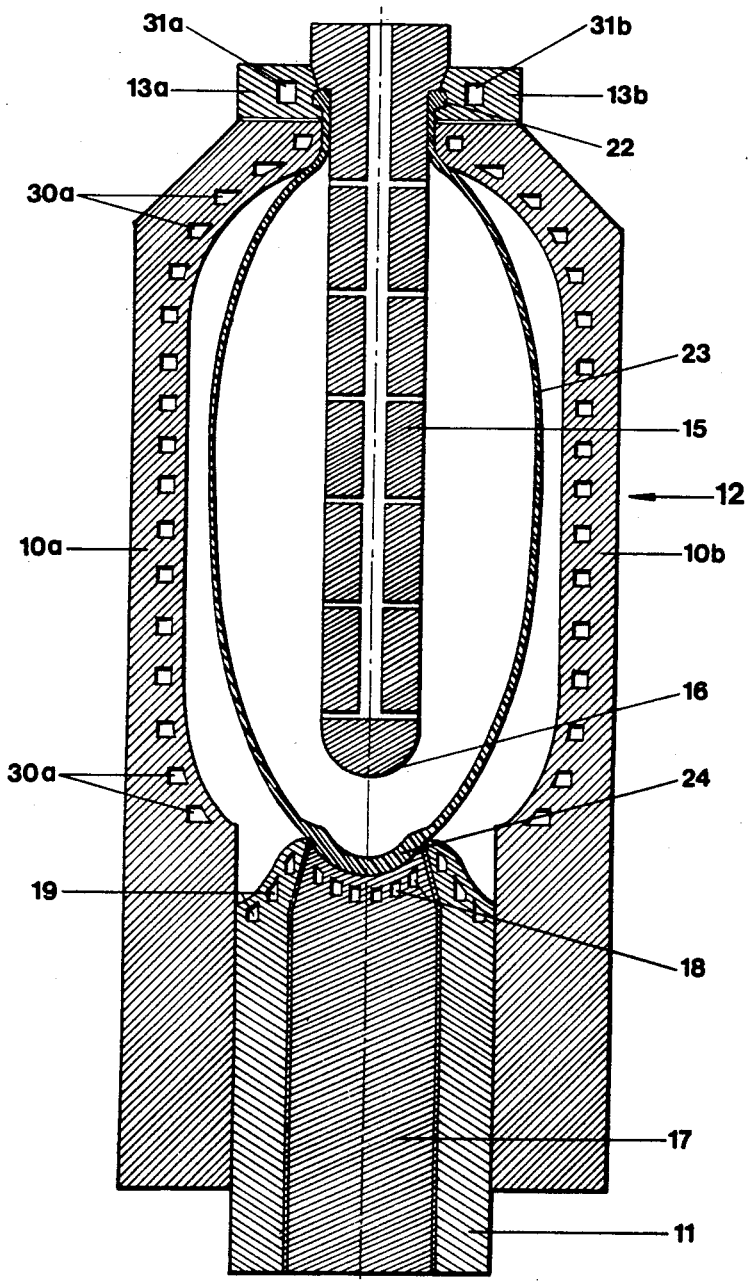
FIG. 2 shows a corresponding longitudinal section during conversion of the preform, and with the base portion moving towards the orifice portion of the preform.
Figure 3:
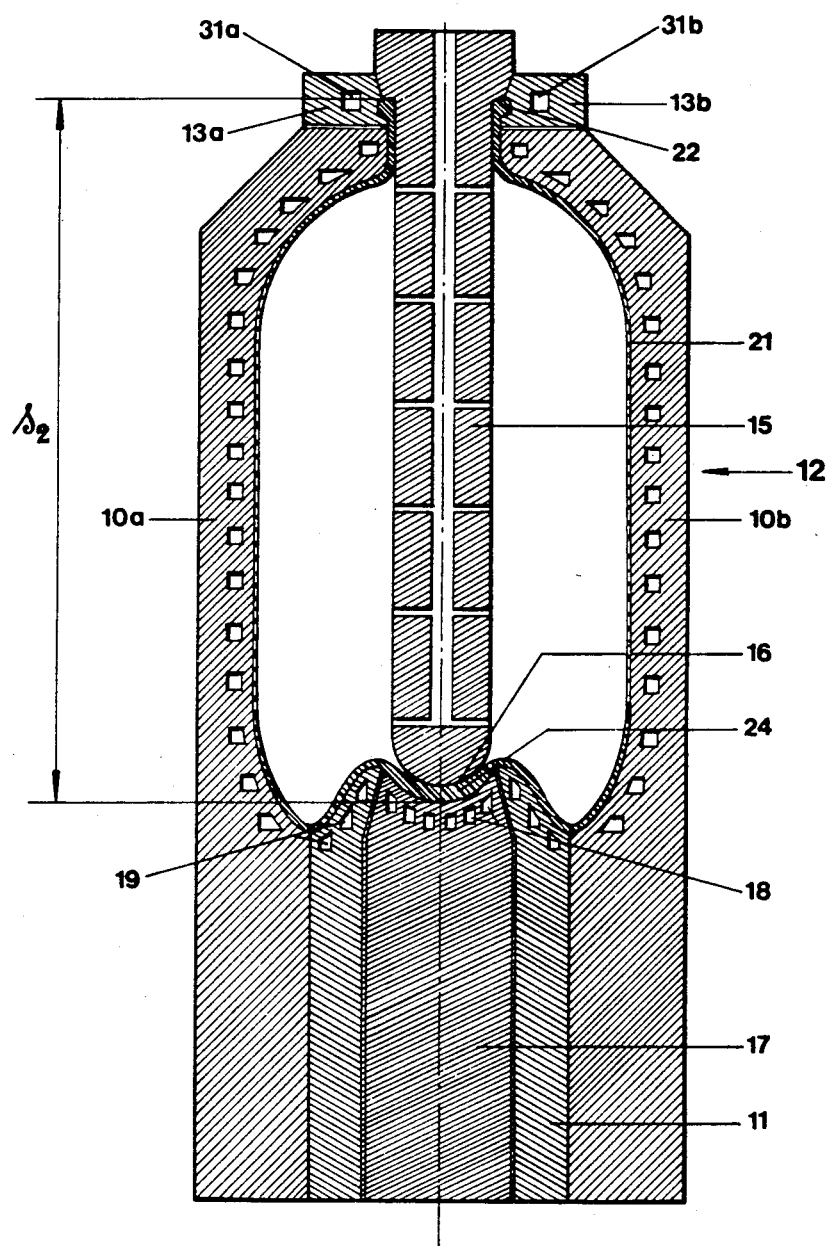
FIG. 3 shows a corresponding longitudinal section, with the base portion in its upper position and with the preform converted to the container

FIGS. 1–3 show two mould halves 10 $a,b$, which are movable, in the direction of the arrows A, B, to and fro from the position as shown in the figures. The mould halves cooperate with a third mould portion in order conjointly to form a blow mold 12, in which the third mould portion 1 is the base portion of the blow mold 12. The base portion can be moved between a lower position (FIG. 1) and an upper position (FIG. 3) by means of drives (which are not shown in the figures). In the upper position, the base portion, together with the mould halves, constitutes the assembled blowmould.

The base portion is provided with a central mould portion 17 which is thermally insulated from the rest of the base portion. A number of channels 18 for the transportation of liquid are present in the central shaping portion. Channels 19, serving a corresponding function, are located in the outer parts of the base portion, similarly to channels 30 in the mould halves.

Furthermore, gripping devices 13 $a,b$ are connected to the upper parts of the mould halves and cooperate with a mandrel 15 so as to hold a preform 20 at its mouth or orifice 22. The gripping devices also possess channels 31 for the transportation of liquid for temperature control.

The mandrel 15 has a length matching the upper position of the base portion 11, so that with this base portion in its upper position a space is created, between a lower shaping surface 16 of the mandrel and the central mould portion 17 of the base portion 11, which space has a shape and thickness determined by the intended shape and thickness of the moulded container.

Furthermore, the mandrel is provided with a main channel 14 for the pressure medium, which via the side channels 33 passes to the surface of the mandrel and hence to the interior of the preform 20.

In FIG. 1, the preform is placed in the blow mould and the central portion 24 of material of the base of the preform is in contact with the base portion 11 of the blow mold 12.

FIG. 3 shows a moulded container 21, and FIG. 2 shows a body 23 which illustrates the preform being converted to the container 21.

Figure 4:
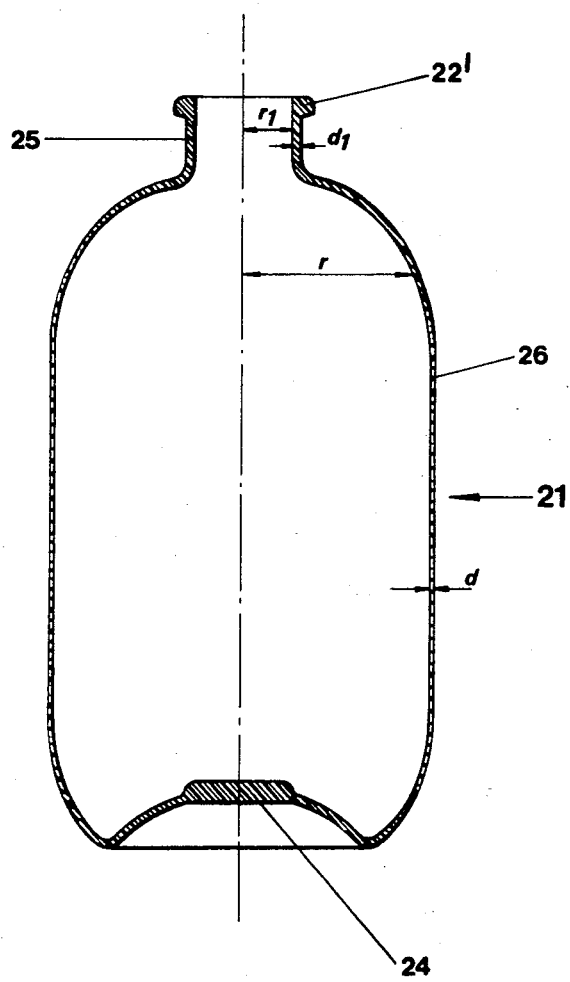
FIG. 4 shows a container produced in accordance with the invention.

FIG. 4 shows, in detail, a container according to the invention. The container has a neck portion 25 with an upper part which forms the orifice edge 22. The actual container body, 26, has in its base portion a central material portion 24. In the figure, the radius and material thickness of the neck portion are designated $r_1$ and $d_1$ respectively, while r and d are the radius and material thickness of the container body in an arbitrary plane at right angles to the axis of the container.

The material thickness d varies in the container body with the radius r of the container body, so that the ratio of the material thickness d of the container body to the material thickness $d_1$ of the neck portion is approximately equal to the ratio of the radius $r_1$ of the neck to the radius r of the container body. The neck consists of axially oriented material and the container body of biaxially oriented material.

In a preferred embodiment, the central material portion 24 and/or the orifice edge 22 consist of thermo-crystallized, opaque, dimensionally stable material.

In employing the invention, a tubular blank is stretched in its axial direction by passing it through one or more draw rings, which reduce the wall thickness of the blank and at the same time diminish the outer circumference of the blank. Immediately prior to stretching, the material of the blank is at a temperature within or preferably below the range of the glass transition temperature (TG) of the material.

The preform 20, produced by stretching the blank, is then, after having been heated to the moulding temperature, introduced into the blow mold 12. The mandrel 15 is introduced into its position inside the preform, thereby holding the orifice of the preform 22 against the gripping devices 13a and 13b. The base portion 11 of the blow mold 12 is in its lower position. The heating medium passes through the channels 18, 19, 30, 31 so as to bring to temperature the adjacent shaping surfaces of the blow mold and above all to heat up the surfaces adjoining the gripping devices 13a 13b around the orifice 22 of the preform.

Thereafter, the interior of the preform is placed under pressure by means of a pressure medium at the same time as the base portion 11 of the blow mold is moved towards the orifice of the preform, that is to say upwards in the figures. As a result, the preform expands at the same time that its axial length is reduced (see FIG. 2), so that the material of the preform is stretched essentially only in the circumferential direction of the preform i.e. there is no axial stretching or strain of the preform. When the base portion of the blow mold has reached its upper position (FIG. 3), all portions of the material of the preform have also been brought into contact with the inner shaping surfaces of the blow mold by means of the pressure medium, and the preform has been converted to the container 21.

In certain embodiments, the inner pressure in the container is maintained for some time so that reliable contact with the blow mold is achieved. The shaping surfaces of the blow mold are then at a temperature in the range of between 110° and 180° C., preferably 130° and 150° C., as a result of which possible stresses in the material are released through contact and at the same time a certain amount of thermal crystallization takes place in the material. This mechanically stabilizes the shape of the container, and the latter can, without major change of shape, be reheated to the temperature at which the heat-stabilization took place.

When the heat-stabilization of the container is finished, the mould halves are opened, the base portion of the blow mold is moved to its lower position and the produced container is taken out of the blow mould.

In certain applications, there occurs cooling of the material of the preform and hence of the central base portion of the container, i.e. of the material which in this case is reshaped, and/or reduced in thickness, between the shaping surface 16 of the mandrel 15 and the central mould portion 17 of the base portion 11 of the blow mold. This gives a container whose central base portion consists of amorphous material. In other applications, the material is heated as just described in connection with the heat-stabilization of the container, with the shaping surface 16 of the mandrel 15 having a temperature within the range at which the amorphous material will crystallize, preferably a temperature of 130°-160° C. In this way, the central base portion of the container is converted to a thermo-crystallized, opaque, dimensionally stable material.

In certain applications, where the requirement for dimensional stability of the moulded container at elevated temperatures is not as great, the material in the preform is stretched, during moulding, also in the axial direction of the preform. The stretching is however relatively slight and in the case of PET must not be equivalent to more than about 30% lengthening of the material. The axial stretching ratio is controlled, according to the invention, by the amount of the vertical movement of the base portion 11 of the blow mold.

The invention has been described above in connection with a blow mold whose base portion travels in the axial direction of the blow mold during the conversion of the preform to a container. It is obvious that the invention is not restricted to the design described, but that the concept of the invention as such can also be realized, for example, by means of a blow mould which has a fixed base portion, and in which the gripping halves, together with the mandrel, are moved in the axial direction of the blow mold during the conversion of the preform.

A container according to the invention has a crystallinity, in the neck portion 25, of the order of 10–30% and, in the container body 26, of the order of about 10–40%. In the embodiment where the central shaping portion 17 keeps the central base portion 24 at a temperature which does not cause thermally conditioned crystallization, or causes this crystallization only to a slight extent (such a temperature being, for PET, below about 100° C.), an amorphous central base portion 24, with a crystallinity of less than 10% preferably less than 5%, is obtained. In the case where the central shaping portion 17 holds the material at the cristallization temperature (about 140° C. for PET), a cristallization, opaque, extremely dimensionally stable central area of material, with a crystallinity in excess of about 10%, is obtained. Similar conditions regarding crystallinity apply to the edge of the orifice 22, depending on whether it has been cooled or heated to the temperature regions just mentioned, by the mandrel 15 and/or gripping devices 13 a, b.

The crystallinity values stated in the present application relate to the theories disclosed in the publication "Die Makromolekulare Chemie" 176, 2459–2465 (1975).

The invention will be clear not only from the above description but its scope and extent will become evident from the claims which follow.

What is claimed is:

1. A method of forming a container from orientable thermoplastic material comprising:
   providing a hollow preform of thermoplastic material including a side wall and a closed end, the material of said side wall having axial orientation and being capable of circumferential expansion and circumferential orientation,
   positioning the preform in a mold having a movable mold part,
   expanding the preform in the mold to form the container,
   said preform, prior to its formation to the finished shape of said container, coming into contact with said movable mold part without any axial stretching of said side wall, and
   displacing the closed end portion of the preform by said movable mold part in correspondence with the expanding of the preform such that the material of the side wall is not stretched in a plane perpendicular to the direction of expanding and thereby the material does not undergo any axial strain due to elongation and said expanding produces circumferential stretching and circumferential orientation of the material in said side wall independent of and superimposed on said axial orientation.

2. A method as claimed in claim 1 wherein said preform is progressively expanded in correspondence with progressive displacement of the closed end of the preform.

3. A method as claimed in claim 1 comprising effecting said expanding with the temperature of the material in the vicinity of the glass transition temperature ($T_g$).

4. A method as claimed in claim 3 wherein the axial orientation of the material of the preform is effected by stretching the material in the axial direction at a temperature within or below the region of the glass transition temperature ($T_g$) of the material.

5. A method as claimed in claim 4 wherein said preform is tubular and is stretched in its axial direction to reduce its wall thickness while concurrently diminishing the outer circumference of the preform.

6. A method as claimed in claim 5 wherein the inner diameter of the preform is substantially maintained during the stretching of the blank.

7. A method as claimed in claim 4 wherein said preform is tubular and has inner and outer surfaces, said preform being stretched in its axial direction to reduce the wall thickness while substantially maintaining the diameter of one of said surfaces and changing the diameter of the other of said surfaces.

8. A method as claimed in claim 1 comprising heating said preform, prior to placement in the mold, to a temperature above the glass transition temperature ($T_g$).

9. A method as claimed in claim 1 wherein the preform is at a molding temperature prior to expanding.

10. A method as claimed in claim 1 wherein the side wall of the preform is out of contact with the mold when the closed end of the preform contacts said movable mold part.

11. A method as claimed in claim 1 wherein the preform comes into contact with said movable mold part before the preform is expanded.

12. A method as claimed in claim 11 wherein said expanding is effected by blowing under pressure.

13. A method as claimed in claim 1 wherein the circumferential stretching of the side wall causes reduction in the thickness thereof such that the resultant thickness of the side wall is inversely related to its diameter.

14. A method as claimed in claim 1 wherein said closed end of said preform is compressed against said movable mold part to undergo shaping and thickness change.

15. A method as claimed in claim 1 wherein said mold is heated and said container undergoes heat transfer with the mold and consequent heat setting.

16. A method as claimed in claim 1 wherein during the expanding of the preform to said container, said moveable mold part is moved in the axial direction of the preform, to assume an upper position corresponding to the final shape of the mold and thereby also to the final shape of the container produced in the mold.

17. A method as claimed in claim 16 wherein a central portion of the closed end of the preform is reduced in thickness by compressing the material in said central portion between the movable mold part and a mandrel located inside the preform.

18. A method as claimed in claim 17 wherein said preform is expanded to said container by applying pressure inside the preform to expand the same against the walls of the mold, said method further comprising supplying heat to the preform from said walls so that the material of the container, through heat transmission from the mold, acquires an additional crystallinity over and above that which results from the orientation of the material while additionally internal stresses of the material originating from the orientation are released.

19. A method as claimed in claim 1 wherein said thermoplastic material is polyethylene terephthalate, polyhexamethylene adipamide, polycaprolactam, polyhexamethylene sebacamide, polyethylene 2,6- and 1,5-naphthalate, polytetramethylene 1,2-dioxybenzoate or copolymers of ethylene terephthalate and ethylene isophthalate.

20. A method as claimed in claim 4 wherein the material has been stretched to undergo flow.

21. A method as claimed in claim 4 wherein said thermoplastic material is polyethylene terephthalate and said preform is stretched at least about 3-fold.

22. A method as claimed in claim 1 wherein said thermoplastic material is polyethylene terephthalate and said preform is produced by stretching a blank at a temperature below 105°.

23. A method as claimed in claim 22 wherein the temperature of the material at stretching is between 70° and 105° C.

* * * * *